United States Patent

Kawakami

Patent Number: 5,271,228
Date of Patent: Dec. 21, 1993

[54] TURBOCHARGED ENGINE

[75] Inventor: Toshiro Kawakami, Obu, Japan

[73] Assignee: Aisin Seiki Kabushiki Kaisha, Kariya, Rep. of Korea

[21] Appl. No.: 857,438

[22] Filed: Mar. 25, 1992

[30] Foreign Application Priority Data

Mar. 26, 1991 [JP] Japan .................. 3-025702[U]

[51] Int. Cl.⁵ .................................. F02B 37/12
[52] U.S. Cl. .................................. 60/602
[58] Field of Search ............... 60/600, 601, 602, 603

[56] References Cited

U.S. PATENT DOCUMENTS

| | | | |
|---|---|---|---|
| 3,150,814 | 9/1964 | Evans et al. | 60/602 X |
| 4,461,149 | 7/1984 | Suzuki | 60/602 |
| 4,637,210 | 1/1987 | Yamamoto | 60/602 |

FOREIGN PATENT DOCUMENTS

| | | | |
|---|---|---|---|
| 2446923 | 9/1980 | France | 60/602 |
| 206727 | 12/1982 | Japan | 60/602 |
| 534 | 1/1984 | Japan . | |
| 536 | 1/1984 | Japan . | |
| 85426 | 5/1984 | Japan | 60/602 |

*Primary Examiner*—Michael Koczo
*Attorney, Agent, or Firm*—Oblon, Spivak, McClelland, Maier & Neustadt

[57] ABSTRACT

A turbocharged engine includes intake passage and an exhaust passage connected with the engine, a compressor rotor of a turbocharger inserted in the intake passage, a turbine rotor of the turbocharger inserted in the exhaust passage and connected with the compressor rotor, a bypass passage connecting an upstream side of the turbine rotor and a downstream side thereof in parallel with the exhaust passage, an opening formed between the exhaust passage and the bypass passage, a first port formed at a downstream side of the compressor rotor in the intake passage and supplying a first signal pressure, a second port formed at a scroll portion of the turbocharger in the compressor rotor side and supplying a second signal pressure, a waste gate valve opening or closing the opening according to the first or second signal pressure, and a 3-way valve connecting the signal pressure chamber to the first port or second port selectively. When a revolution number of the engine is low, the 3-way valve connects the signal pressure chamber the second port and when a revolution number of the engine is high, the 3-way valve connects the signal pressure chamber to the first port.

1 Claim, 4 Drawing Sheets

TURBOCHARGED ENGINE

BACKGROUND OF THE INVENTION

1. Field of the Invention

The present invention relates to a turbocharged engine and more particularly to a turbocharged engine which has the best supercharging character for a motor vehicle.

2. Description of the Related Art

A conventional turbocharged engine 73 for a motor vehicle, as shown in FIGS. 4, 5, is disclosed in Japanese Utility Model Laid-open No. 59(1984)-534. Here, each one end of an intake passage 71 and an exhaust passage 72 are connected to the engine 73. An air cleaner 74 is connected to the other end of the intake passage 71. A compressor rotor 75 of a turbocharger 70 is inserted in the intake passage 71 and a turbine rotor 76 thereof is inserted in the exhaust passage 72. A shaft 77 connects the compressor rotor 75 and the turbine rotor 76.

In the exhaust passage 72, a bypass passage 78 connects upstream side of the turbine rotor 76 and downstream side thereof. A waste gate valve 79 opens or closes an opening 82 formed between the bypass passage 78 and the upstream side of the turbine rotor 76 in the exhaust passage 72 via a valve 81 according to a signal pressure S. The signal pressure S is supplied from a port 80 formed at a downstream side of the compressor rotor 75 in the intake passage 71.

In the waste gate valve 79, an atmospheric pressure chamber 83 and a signal pressure chamber 84 are formed in the housing and are separated by a diaphragm 85 from each other. One end of the valve 81 is fixed to the diaphragm 85. Springs 86, 87 are located in the atmospheric pressure chamber 83 and urge the valve 81 downwardly. The signal pressure S is introduced into the signal pressure chamber 84.

In the above-mentioned turbocharged engine 73, an exhaust gas E flows in the exhaust passage 72 and makes the turbine rotor 76 rotate. So, the compressor rotor 75 is rotated with the turbine rotor 76 via the shaft 77. Intake air N is supercharged to the engine 73 by the compressor rotor 75. One part of the supercharging pressure is introduced as the signal pressure S to the signal pressure chamber 84. The signal pressure S in the signal pressure chamber 84 urges the valve 81 upwardly against the springs 86, 87. Thus, if the signal pressure S is over a setting pressure (ex. 0.5~0.8[kg/cm]), fluid communication between the exhaust passage 72 and the bypass passage 78 is established. So, one part of the exhaust gas E flows into the bypass passage 78, and the revolution number of the turbine rotor 76 decreases. Consequently, the supercharging pressure also decreases.

In FIG. 6, an ideal supercharging character is shown by the solid line X, and an supercharging character of the turbocharger 70 is shown by the chain line Y. Namely, after the supercharging pressure increases to the point B along the solid line, the supercharging pressure is kept at a fixed pressure. That is to say, from the high pressure region over the point B, the valve 81 opens the opening 82. This is the ideal supercharging character. However, in the turbocharged engine 73, a pressure of the exhaust gas pushes the valve 81 upwardly with the signal pressure S, so for a pressure beyond the point T, the valve opens the opening 82. Thus, a sufficient supercharging pressure is not achieved in the region Z.

SUMMARY OF THE INVENTION

Accordingly, it is a primary object of the present invention to give the best supercharging character for a turbocharger.

The above and other objects are achieved according to the present invention by a turbocharged engine which comprises an intake passage and an exhaust passage connected with the engine, a compressor rotor of a turbocharger inserted in the intake passage, a turbine rotor of the turbocharger inserted in the exhaust passage and connected with the compressor rotor, a bypass passage connecting an upstream side of the turbine rotor and a downstream side thereof in parallel with the exhaust passage, an opening formed between the exhaust passage and the bypass passage, a first port formed at a downstream side of the compressor rotor in the intake passage and supplying a first signal pressure, a second port formed at a scroll portion of the turbocharger in the compressor rotor side and supplying a second signal pressure, a waste gate valve opening for closing the opening according to the first or second signal pressure, and a 3-way valve connecting the signal pressure chamber the first port or second port selectively, wherein when a revolution number of the engine is low, the 3-way valve connects the signal pressure chamber to the second port, when a revolution number of the engine is high, the 3 way valve connects the signal pressure chamber to the first port.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
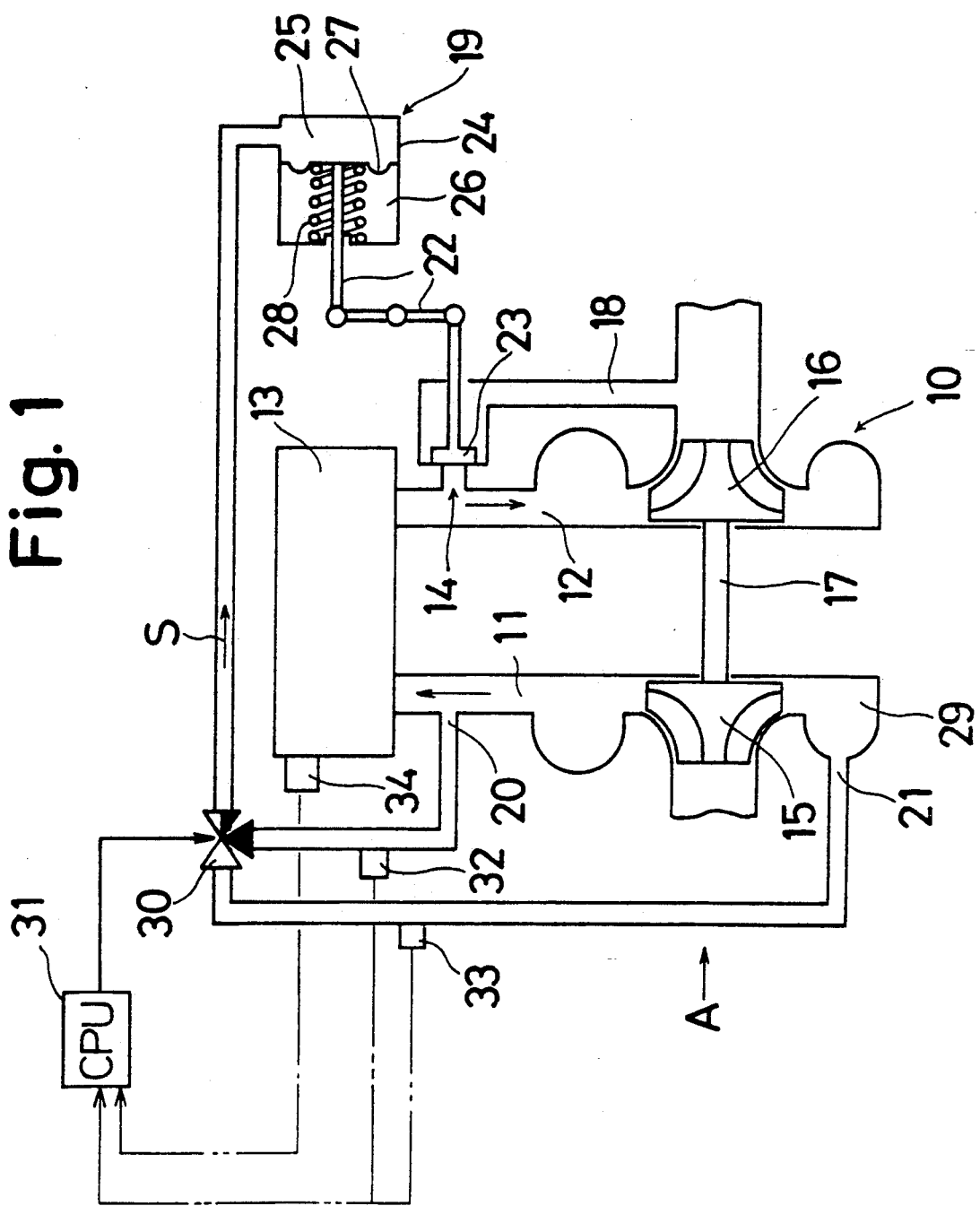
FIG. 1 is an elevational view of a turbocharged engine according to the invention.
Figure 2:
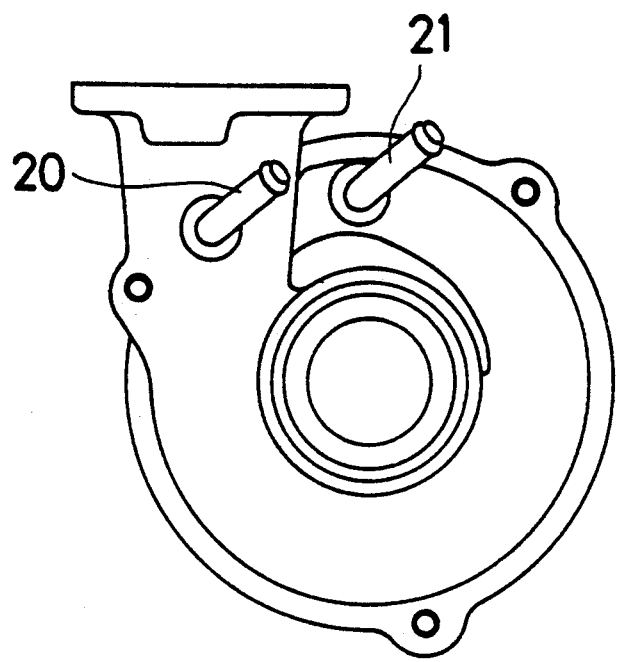
FIG. 2 is an side elevational view of a turbocharger as seen from "A" direction in FIG. 1.

Referring first to FIGS. 1,2, each end of an intake passage 11 and an exhaust passage 12 are connected to a turbocharged engine 13. A compressor rotor 15 of the turbocharger 10 is inserted in the intake passage 11 and a turbine rotor 16 thereof is inserted in the exhaust passage 12. A shaft 17 connects between the compressor rotor 15 and the turbine rotor 16.

In parallel with the exhaust passage 12, a bypass passage 18 connects an upstream side of the turbine rotor 16 and a downstream side thereof. A waste gate valve 19 controls a valve 23 via a rod 22 in order to open or close an opening 14 formed between the bypass passage 18 and the upstream side of the turbine rotor 16 in the exhaust passage 12. An inner space of a housing 24 of the waste gate valve 19 is divided into a signal pressure chamber 25 and an atmospheric pressure chamber 26 which are separated from each other by a diaphragm 27. The valve 23 is urged for closing the opening 14 by a spring 28 located in the atmospheric pressure chamber 26.

A signal pressure S is supplied into the signal pressure chamber 25 from a first port 20 formed at a downstream side of the compressor rotor 15 in the intake passage 11 or a second port 21 formed at a scroll portion 29, this being done selectively by a 3-way valve 30. The 3-way valve 30 is controlled by a CPU (Central Processing Unit) 31. Each pressure value of the first and second ports 20,21 is converted into an electric signal by pressure sensors 32,33 and the electric signal is inputted into the CPU 31. In addition, a revolution number of the engine 13 is inputted into the CPU 31 via a revolution sensor 34.

Figure 3:
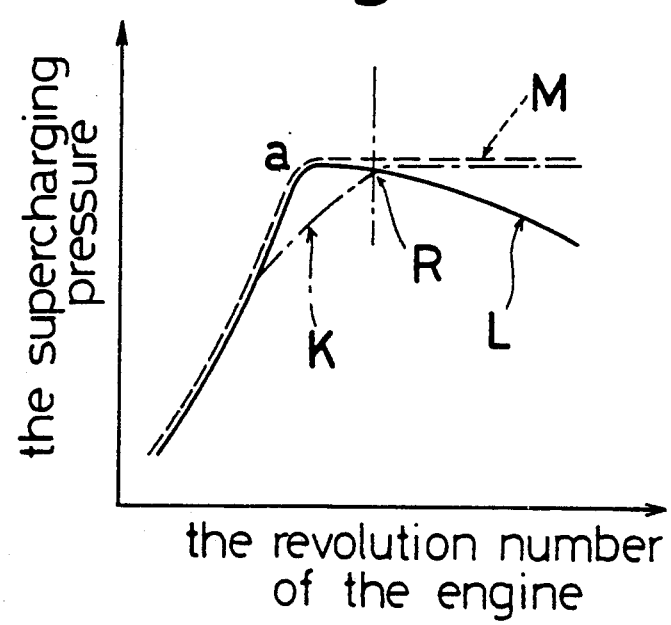
FIG. 3 is a supercharging characteristic chart of an engine shown in FIG. 1.
Figure 5:
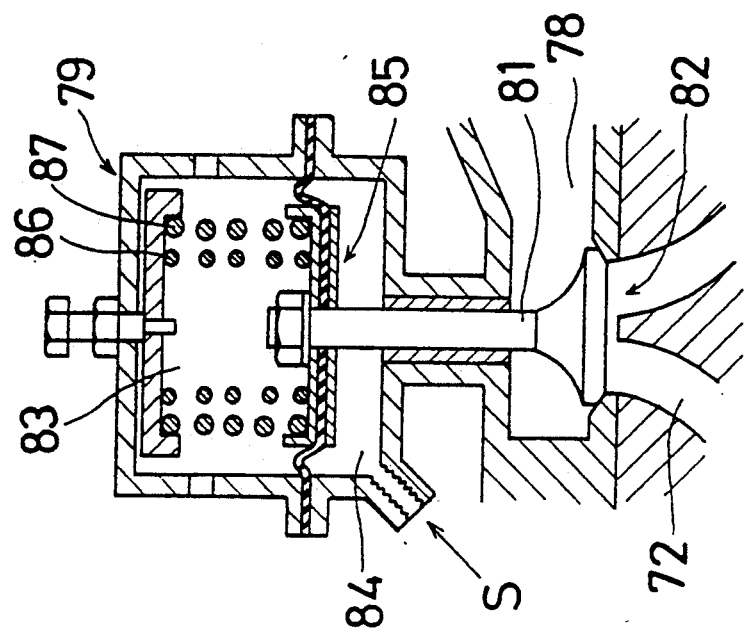
FIG. 5 is a fragmentary sectional view of a waste gate valve shown in FIG. 4.
Figure 4:
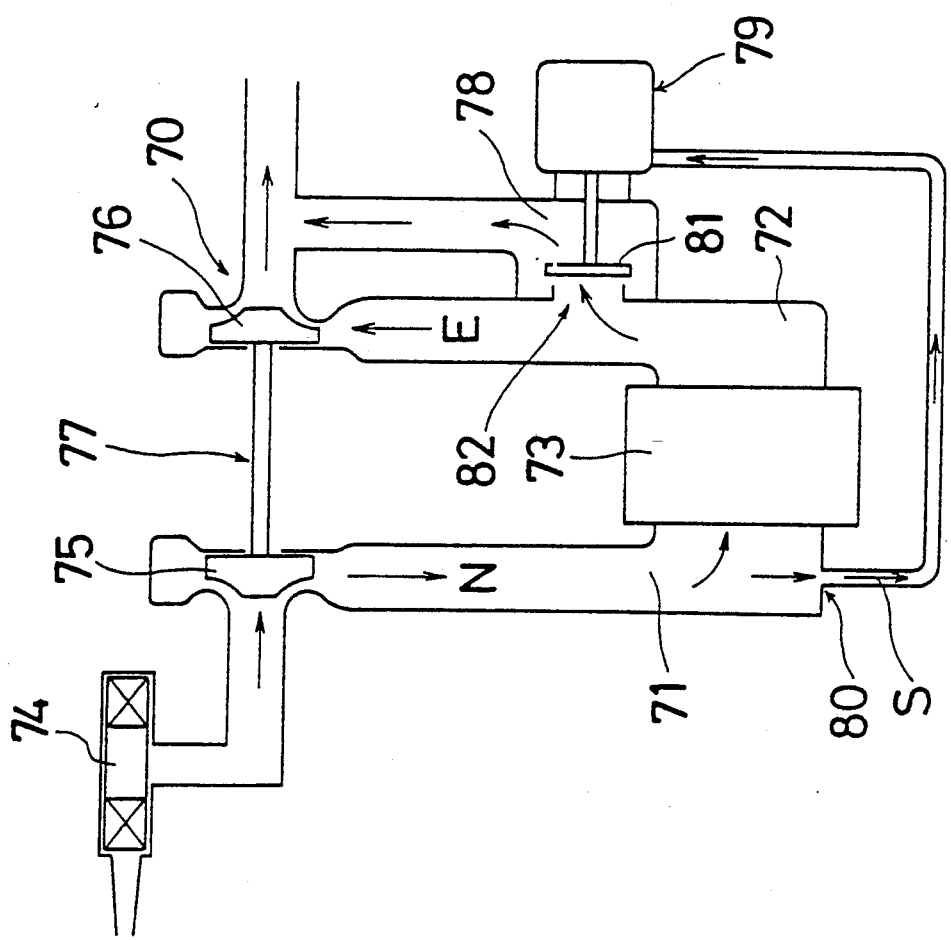
FIG. 4 is an elevational view of a conventional turbocharged engine.
Figure 6:
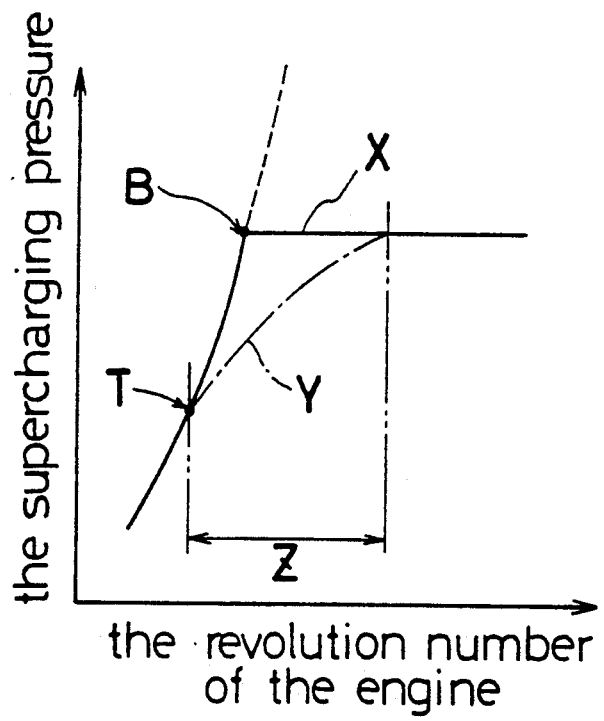
FIG. 6 is a supercharging characteristic chart of an engine shown in FIG. 4.

Referring to FIG. 3, a supercharging character, when the signal pressure S is supplied to the signal pressure chamber 25 from the port 20, is shown by the chain line K and a supercharging character, when the signal pressure S is supplied to the signal pressure chamber 25 from the port 21, is shown by the solid line L. A dash line M shows an ideal supercharging character. Because, when the revolution number of the engine 13 is low, the pressure of the port 21 is lower than the pressure of the port 20 and when the revolution number of the engine 13 is high, the pressure of the port 20 is lower than the pressure of the port 21. That is to say, pressures of the ports 20,21 are reversed at the point R.

Therefore, first, the 3-way valve 30 connects the signal pressure chamber 25 to the port 21 only. Next, at the point R, the 3-way valve 30 connects the signal pressure chamber 25 to the port 20 only. As a result, before the point R, the supercharging character follows curve L and after the point R, the supercharging character follows curve K. Consequently, the total supercharging character of the turbocharger 10 approximates the ideal supercharging character M.

Next, two alternative changing techniques of the 3-way valve 30 are described. First, at the point R, the pressure difference between the port 20 and the port 21 is zero. So, the CPU 31 can check the difference between the electric signal of the pressure sensor 32 and the electric signal of the pressure sensor 33, and the CPU 31 controls the 3-way valve 30 to switch when a zero difference is sensed. Alternatively, in the other embodiment, when the revolution sensor senses that the revolution number of the engine 13 equals the revolution number at the point R, the CPU 31 controls the switching of the 3-way valve 30.

Obviously, numerous modifications and variations of the present invention are possible in light of the above teachings. It is therefore to be understood that within the scope of the appended claims, the invention may be practiced otherwise than as specifically described herein.

What is claimed is:

1. A turbocharged engine comprising:
    an intake passage and an exhaust passage connected with the engine;
    a compressor rotor of a turbocharger inserted in the intake passage;
    a turbine rotor of the turbocharger inserted in the exhaust passage and connected with the compressor rotor;
    a bypass passage connecting an upstream side of the turbine rotor and a downstream side thereof in parallel with the exhaust passage;
    an opening formed between the exhaust passage and the bypass passage;
    a first port formed at a downstream side of the compressor rotor in the intake passage and supplying a first signal pressure;
    a second port formed at a scroll portion of the turbocharger in the compressor rotor side and supplying a second signal pressure;
    a waste gate valve having a signal pressure chamber and opening or closing the opening according to the first or second signal pressure;
    a 3-way valve connecting the signal pressure chamber to the first port or second port selectively;
    a first pressure sensor disposed in a passage connecting the first port with the 3-way valve;
    a second pressure sensor disposed in a passage connecting the second port with the 3-way valve; and
    control means for switching the 3-way valve when the pressure detected by the first pressure sensor is equal to the pressure detected by the second pressure sensor, said control means comprising means for connecting the second port to the waste gate valve when the pressure detected by the second pressure sensor is lower than the pressure detected by the first pressure sensor, said control means further comprising means for connecting the first port to the waste gate valve when the pressure detected by the second pressure sensor is higher than the pressure detected by the first pressure sensor.

* * * * *